(12) United States Patent
Lucas et al.

(10) Patent No.: US 10,515,484 B1
(45) Date of Patent: Dec. 24, 2019

(54) SYSTEMS AND METHODS TO FACILITATE INTERACTIONS WITH VIRTUAL CONTENT IN AN INTERACTIVE SPACE USING VISUAL INDICATORS

(71) Applicant: Meta View, Inc., San Mateo, CA (US)

(72) Inventors: Benjamin Lucas, San Francisco, CA (US); Michael Stein, San Francisco, CA (US); Mayan Shay May-Raz, San Francisco, CA (US); Kharis O'Connell, San Mateo, CA (US)

(73) Assignee: Meta View, Inc., San Mateo, CA (US)

( * ) Notice: Subject to any disclaimer, the term of this patent is extended or adjusted under 35 U.S.C. 154(b) by 10 days.

(21) Appl. No.: 15/789,882

(22) Filed: Oct. 20, 2017

(51) Int. Cl.
*G06T 19/00* (2011.01)
*G06F 3/01* (2006.01)

(52) U.S. Cl.
CPC ............ *G06T 19/006* (2013.01); *G06F 3/017* (2013.01)

(58) Field of Classification Search
CPC .............................. G06T 19/006; G06F 3/017
See application file for complete search history.

(56) References Cited

U.S. PATENT DOCUMENTS

| | | |
|---|---|---|
| 2004/0166934 A1 | 8/2004 | Nakata |
| 2009/0077504 A1 | 3/2009 | Bell |
| 2014/0201690 A1 | 7/2014 | Holz |
| 2015/0193124 A1* | 7/2015 | Schwesinger ........... G06F 3/017 715/863 |
| 2016/0104322 A1* | 4/2016 | Fleischmann ......... G06T 19/006 345/419 |
| 2016/0189427 A1 | 6/2016 | Wu |
| 2016/0378294 A1* | 12/2016 | Wright ................ G06F 3/04815 715/851 |
| 2017/0140552 A1* | 5/2017 | Woo ........................ G06F 1/163 |
| 2017/0185151 A1 | 6/2017 | Pahud |
| 2017/0235143 A1 | 8/2017 | Chi |
| 2017/0235372 A1* | 8/2017 | Song .................... G03H 1/2286 345/158 |
| 2018/0046245 A1* | 2/2018 | Schwarz ............ G02B 27/0093 |
| 2018/0267688 A1* | 9/2018 | Zhou ...................... G06F 3/017 |

OTHER PUBLICATIONS https://www.youtube.com/watch?v=4sKI_2XYMFs&feature=youtu.be&t=2m29s; DevUp: VR Guitar/Harp/Instrument (Oct. 22, 2015); 5 pages.
https://www.youtube.com/watch?v=hFpdHjA9uR8 ; Hoverboard VR Interface; Mar 12, 2015; 6 pages.
https://youtu.be/RNTXWV-P99k?t=14s; Firework Factory VR: Walk-through (v1.0.2); Oct 3, 2015; 6 pages.

* cited by examiner

*Primary Examiner* — Maurice L. McDowell, Jr.

(57) ABSTRACT

A system configured to facilitate interactions with virtual content in an interactive space may comprise one or more of a hand tracking device, a light source, an optical element, one or more physical processors, non-transitory electronic storage, and/or other components. The hand tracking device may be configured to generate output signals conveying ranges of surfaces and/or objects present in the real world. A hand of a user may be identified and tracked through three-dimensional space. A virtual cursor may be presented as positionally linked with the hand. The virtual cursor may be modified to reflect change in hand pose. As the hand comes close to virtual objects, an individual virtual object may be modified to reflect which virtual object is closest to the hand.

30 Claims, 5 Drawing Sheets

SYSTEMS AND METHODS TO FACILITATE INTERACTIONS WITH VIRTUAL CONTENT IN AN INTERACTIVE SPACE USING VISUAL INDICATORS

FIELD OF THE INVENTION

The systems and methods described herein relate to facilitating interactions with virtual content in an interactive space using visual indicators.

BACKGROUND OF THE INVENTION

There are many types of vision systems that provide virtual or augmented reality displays. In particular, wearable technology such as head-mounted displays (HMD) are becoming more popular.

SUMMARY

The systems and methods described herein facilitate interactions with virtual content (e.g., virtual objects in the form of digital imagery) in an interactive space. The interactions may be facilitated through an interface that provides indicators to a user seeking to interact with virtual content in the interactive space. The indicators may visual indicate one or more of a hand pose, the proximity of one or more of virtual objects to the user's hand, and/or other information. The interactive space may include one or more of an augmented reality environment, a virtual reality environment, and/or other interactive spaces. An augmented reality environment may include views of images forming virtual content superimposed over views of the real world. A virtual reality environment may include views of images forming virtual content within a virtual environment. The terms "space" and "environment" may be used interchangeably herein.

An augmented reality environment may be generated by superimposing images forming virtual content over views of the real world. The images may be presented so that the virtual content formed by the images may be perceived to be within the user's field of view. Some users may have difficulty judging and/or perceiving distance of virtual content within their field of view of the augmented reality environment. This difficulty may be exacerbated when there are multiple virtual objects available for interaction. In some cases, when a user attempts to interact with a virtual object, for example, using their hand, the user may inadvertently interact with another virtual object. The systems and methods described herein propose one or more solutions to aid a user in interacting with the virtual content that the user desires to manipulate. For example, one or more visual indicators may be provided in the views of virtual content. The visual indicators may be configured to indicate one or more virtual objects nearest to the user's hand, pose of the hand as it relates to performing gestures to interact with virtual objects, and/or other information.

A system configured to facilitate interactions with virtual content in an interactive space may comprise one or more of one or more image-forming components, one or more hand tracking devices, non-transitory electronic storage, one or more physical processors, and/or other components. One or more components of the system may be included in or otherwise held by a client device.

The one or more image-forming components may include light sources and/or optical elements. The one or more image-forming components may be configured to emit light rays forming images of virtual content. The one or more image-forming components may be configured such that when the client device is installed on the head of the user, the light rays may be provided to the eyes of the user. The images formed by the light rays may be superimposed over views of the real world to create the interactive space. The virtual content including a set of virtual objects and/or other virtual content.

The one or more hand tracking devices may be configured to generate output signals conveying depth information and/or other information. The depth information may include ranges of surfaces and/or objects present in the real world.

The one or more physical processors may be configured by machine-readable instructions. The machine-readable instructions may include one or more computer program components. The computer program components may include one or more of a control component, a hand component, an interaction component, a modification component, and/or other components.

The control component may be configured to control individual components of the system.

The hand component may be configured to identify, based on the output signals, presence of a hand of the user. The hand component may be configured to determine, based on the output signals, location of the hand. The hand component may be configured to determine, based on the output signals, the pose of the user's hand.

The interaction component may be configured to correlate the location of the user's hand with an individual virtual object in a set of virtual objects presented within the interactive environment.

The modification component may be configured to instruct the control component to control the one or more image-forming components based on the location and the pose of the user's hand. The control may include directing the one or more image-forming components to, based on the location of the hand, emit light rays forming an image of a virtual cursor such that the virtual cursor is positionally linked with the hand. The control may include directing the one or more image-forming components to, based on determining that the location of the hand is correlated with a first virtual object, modify an image of the first virtual object. The control may include directing the one or more image-forming components to, based on the determining the hand is in a first pose, modify the image of the virtual cursor.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
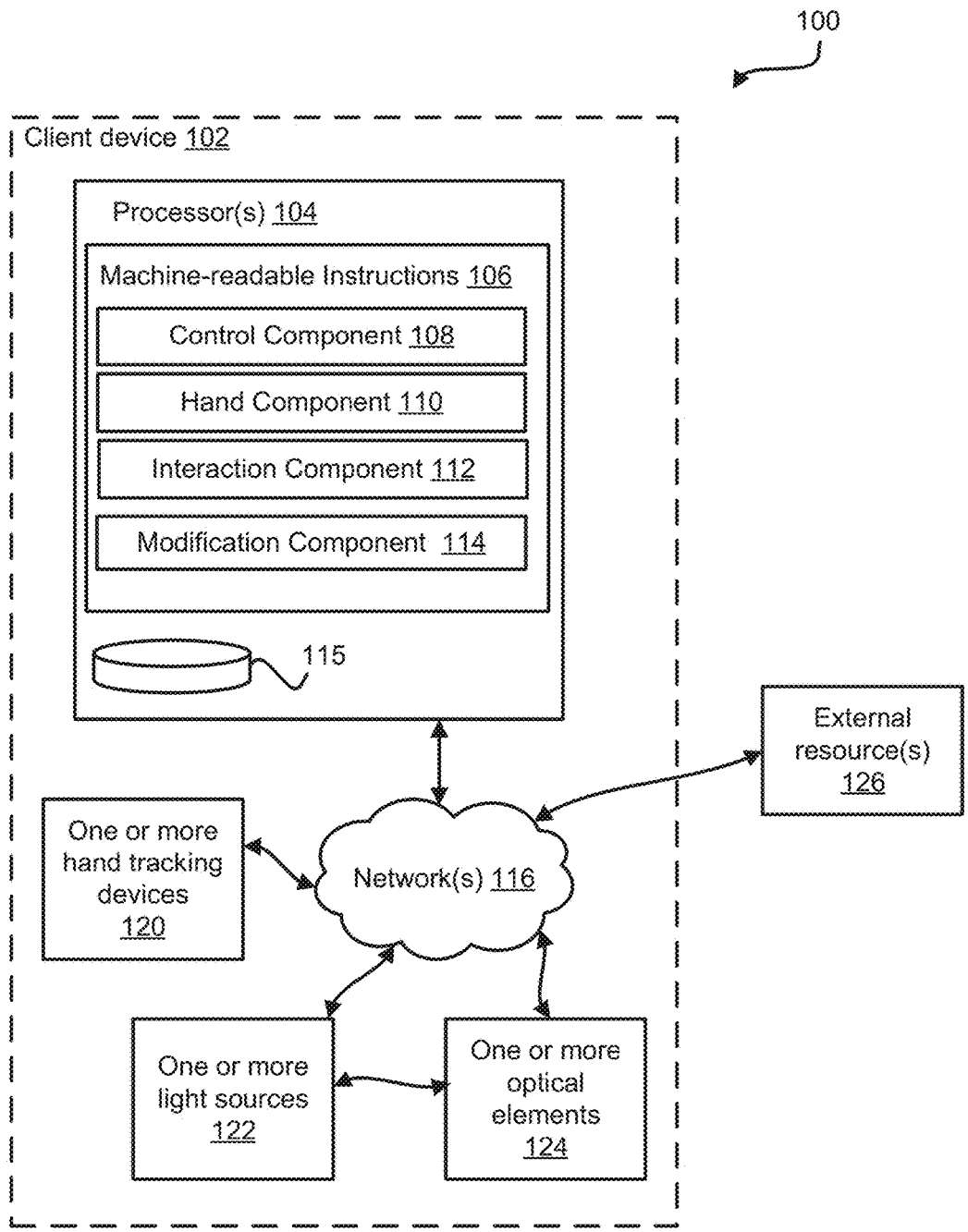
FIG. 1 illustrates a system configured to facilitate interactions with virtual content in an interactive space, in accordance with one or more implementations.

FIG. 1 shows a system 100 configured to facilitate interactions with virtual content in an interactive space, in accordance with one or more implementations. In particular, system 100 may be configured to provide an interface that includes visual indications of one or both of user hand position relative to one or more virtual objects and/or user hand pose. The interactive space may include one or more of an augmented reality environment, a virtual reality environment, and/or other interactive spaces. An augmented reality environment may include views of images forming virtual content superimposed over views of the real world. A virtual reality environment may include views of images forming virtual content within a virtual environment. In the context of an interactive space, the terms "space" and "environment" may be used interchangeably herein.

The human perceptual system can combine various sensory cues in an efficient manner in order to perceive "physically plausible" virtual content in a real world environment. For example, the human perceptual system can integrate, among other things, sensory cues such as one or more of luminance, depth, and/or shape information to form or perceive coherent virtual content. Virtual content may include one or more virtual objects, and/or other content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

It is noted that while one or more features and/or functions of system 100 presented herein may be directed toward an augmented reality environment, this is for illustrative purposes only and is not to be considered limiting. In some implementations, one or more features and/or functions of system 100 may be similarly implemented in a virtual reality environment and/or other interactive environments.

The system 100 may include one or more of a client device 102, one or more physical processors 104, one or more hand tracking devices 120, one or more light sources 122, one or more optical elements 124, and/or other components. In some implementations, one or more components of system 100 may be incorporated into and/or otherwise held by client device 102. The client device 102 may be configured to be worn on a head of a user. The client device 102 may include a headset. The headset may include one or more of a head-mounted display (HMD), glasses, goggles, and/or other devices. In some implementations, one or more physical processors 104, one or more hand tracking devices 120, one or more light sources 122, one or more optical elements 124, and/or other components may be incorporated into one or more of a frame, a head strap, a head band, temple arms, a visor, and/or other components of client device 102.

The depiction of components included within client device 102 is for illustrative purposes only and it not to be considered limiting. For example, in some implementations, one or more components of system 100 may be included in one or more devices external to client device 102. The one or more components may be included in one or more of a desktop computer, a laptop computer, other mobile computer configurations, and/or other devices. By way of non-limiting illustration, one or more physical processors 104 and/or other components may be included in a mobile computing device external to client device 102. The client device 102 may be tethered and/or otherwise connected to the one or more external devices, including a mobile computing device, laptop or desktop computer. Such connection may be wired (e.g., USB and/or other wired connections) and/or wireless (e.g., Bluetooth, Wi-Fi, Li-Fi, and/or other wireless connections).

Figure 3:
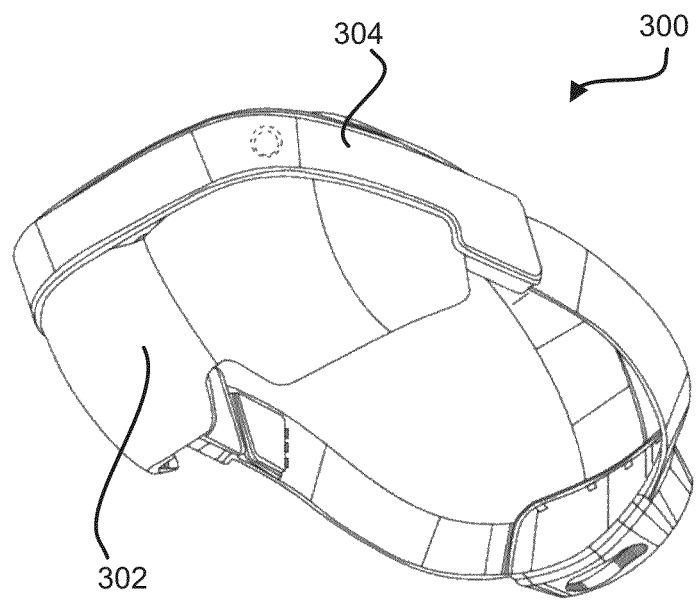
FIG. 3 illustrates an exemplary client device.

Referring now to FIG. 3, in some implementations, client device 102 of FIG. 1 may comprise an HMD 300. One or more components of client device 102 may be held by and/or comprise part of HMD 300. By way of non-limiting illustration, an optical element may comprise at least part of a visor portion 302 of HMD 300. Components including physical processor(s), light source(s), and/or other components may be incorporated into a housing portion 304 and/or other portions of HMD 300.

Returning to FIG. 1, a set of components comprising at least one light source and at least one optical element may be referred to as an image-forming component. An image-forming component may be configured to emit light rays, via a light source, forming images of virtual content. When client device 102 is installed on the head of the user, the light rays may be provided, via an optical element, to an eye of the user. The images formed by the light rays may be superimposed over views of the real world to create an interactive space.

In some implementations, individual ones of one or more light sources 122 may be positioned relative to individual ones of one or more optical elements 124 such that light emitted from an individual light source may be received by individual ones of one or more optical elements 124. The one or more optical elements 124 may form a portion of client device 102 through which a user may view the real world. Individual optical elements of one or more optical elements 124 may be configured to provide the light emitted from the light source to one or both eyes of the user.

In some implementations, individual light sources of one or more light sources 122 may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, individual optical elements of one or more optical elements 124 may comprise one or more reflective and/or partially reflective surfaces. An optical element may be formed from a reflective and/or partially reflective material. A reflective and/or partially reflective material may comprise one or more ZEONEX, Cyclo Olefin Polymer (COP), Cyclic Olefin Copolymer (COC), polycarbonate, Poly (methyl methacrylate) (PMMA), and/or other materials.

In some implementations, individual optical elements of one or more optical elements 124 may be arranged on client device 102 such that, when client device 102 is installed on the head of a user, the user's gaze may be directed toward the one or more optical elements 124. In some implementations, one or more optical elements 124 may be arranged on client device 102 such that, when client device 102 is installed on the head of the user, light rays generated by one or more light sources 122 may be directed onto one or more optical elements 124 to form images of virtual content on one or more optical elements 124. The images of virtual content formed on one or more optical elements 124 may be superimposed over the user's view of the real world through one or more optical elements 124 to create an interactive space.

In some implementations, one or more optical elements 124 may be arranged on client device 102 such that light rays generated by one or more light sources 122 may be directed at one or more optical elements 124, coupled into one or more optical elements 124, and directed out of one or more optical elements 124 into an eye of a user. The images of virtual content may be projected onto a retina of the eye such that the images may be superimposed over the user's view of the real world.

In some implementations, individual optical elements of one or more optical elements 124 may comprise a waveguide and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user.

Figure 4:
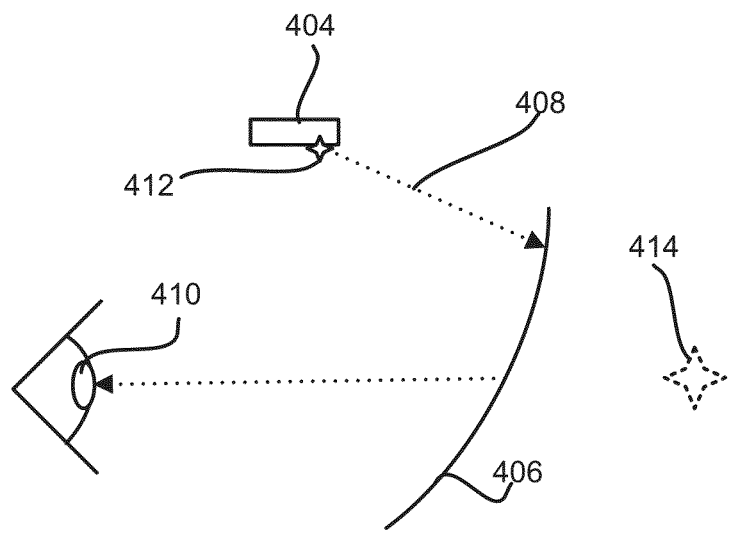
FIG. 4 illustrates an exemplary image-forming component.

FIG. 4 illustrates a configuration of a light source 404 and an optical element 406 of an image-forming component relative an eye 410 of a user, in accordance with one or more implementations. The optical element 406 may comprise, and/or may be part of, a visor portion of a client device (not shown in FIG. 4). The light source 404 may be configured to emit light rays, including light ray 408. The light rays may form images of virtual content, including image 412. The light rays may be received by optical element 406 and provided to eye 410 of the user. The light rays received by eye 410 may form virtual content 414 (e.g., a virtual object) perceived to lie within three-dimensional space in the user's field of view. The virtual content 414 may be superimposed over the user's view of real-world objects and/or surfaces. In some implementations, virtual content 414 may be perceived to be positionally linked with an object present in the real world. For example, virtual content 414 may be superimposed over the object and maintain the superimposition as the object moves in the real world.

Returning to FIG. 1, individual hand tracking devices of one or more hand tracking devices 120 may be configured to generate output signals conveying depth information and/or other information. Depth information may include positions of surfaces and/or objects present in the real world. In some implementations, the surfaces and/or objects may include user objects. The user objects may include one or more of a hand, a palm of a hand, a digit, a set of digits, a tip of a digit, a set of tips for a set of digits, and/or other user objects.

In some implementations, depth information may be in the form of a point cloud and/or other output. A point cloud may include a set of points that may lie on surfaces of real-world objects within a range of the hand tracking device, and/or other sensor output. In some implementations, a position of a point may be expressed as one or more of distance (or range) from one or more hand tracking devices 120, an angle from a reference line (e.g., a horizontal line), and/or other information. A position may be represented as a vector having vector components.

The one or more hand tracking devices 120 may include one or more of a camera, a three-dimensional scanner, a depth sensor, a rangefinder, a laser gauge, a time-of-flight sensor, an IR camera/emitter pair, a passive structured or unstructured light stereo pair, and/or other devices.

In some implementations, information related to objects present in the real world may be determined from depth information. For example, depth information may facilitate determining one or more of presence of objects, the identification of objects, the location of objects, the pose of objects, and/or other information. By determining one or more of presence, identification, and/or location, objects may be tracked through three-dimensional space over time. In some implementations presence of objects may be determined based on groups or groupings of points present in a point cloud. The identification of the objects may be determined based on size, shape, form, and/or other information about the groups of points. For example, a group of points may identify presence of an object. The object may be identified as a human hand (or another known object) based on the group of points having a size, shape, and/or form representative of a human hand (or another known object). A pose of the hand may be determined. The pose of the hand may refer to its heading or orientation (e.g., which way the palm is facing), whether is closed (e.g., in a gripped position) or open (e.g., one or more digits extended), and/or other information. The identification of the hand from depth information may facilitate tracking the hand through three-dimensional space over time.

It is noted that the descriptions of tracking a user hand and/or making determinations of locations of a user hand based on a point cloud is for illustrative purposes only and are not to be considered limiting. In some implementations, hand presence, identification, and/or location tracking may be accomplished using other approaches and/or other devices. For example, a camera and/or other imaging sensor configured to generate image information defining images of a real-world environment within a field-of-view of the camera. Hand tracking and/or location determination may be accomplished using one or more image-based approaches. The one or more image-based approaches may include one or more of computer vision, object recognition, SIFT, SURF, position triangulation, and/or other techniques. For example, while a point within a point cloud may represent a surface of a fingertip and may be used to track the location of the fingertip in three-dimensional space, similar tracking may be carried out using one or more image-based approaches including one or more identifying the fingertip in an image, tracking the fingertip over multiple images, and/or other operations. In this manner, a location determined for the fingertip via an image-based approach may be treated in the same or similar manner as a point within a point cloud representing the surface of the fingertip.

In some implementations, depth information and/or information related to objects present in the real world may be determined by one or more hand tracking device 120 and/or client device 102 (e.g., via hand component 110). For example, one or more hand tracking devices 120 may include one or more physical processors (not shown in FIG. 1). The one or more physical processors may be configured by machine-readable instructions (not shown in FIG. 1). The machine-readable instructions may include one or more computer program components configured to determine, from output signals generated by one or more hand tracking devices 120, the depth information and/or other information. However, as noted that, this functionality may be attributed to hand component 110 of one or more physical processor 104.

In FIG. 1, one or more physical processors 104 may include and/or may be coupled to non-transitory electronic storage 115 and/or other components. The non-transitory electronic storage 115 may be configured to store virtual content information and/or other information. Virtual content information may define virtual content. In some implementations, virtual content may include one or more virtual objects, and/or other virtual content.

Individual virtual objects may be defined by one or more of size, shape, color, functionality, and/or other defining aspects. In some implementations, virtual objects may be functionally configured for user interaction. User interactions may include gesture-based interaction and/or other interactions. In some implementations, virtual objects may be configured for user interaction such that the virtual objects may be manipulated by a user and/or otherwise interacted with by a user. User manipulation may be provided by gesture-based input including one or more of grabbing, moving, swiping, pinching-to-zoom, releasing, throwing, and/or other inputs.

The one or more physical processors 104 may be configured by machine-readable instructions 106. Executing machine-readable instructions 106 may cause one or more physical processors 104 to facilitate interactions with virtual content in an interactive space. The machine-readable instructions 106 may include one or more of a control component 108, a hand component 110, an interaction component 112, a modification component 114, and/or other components.

In some implementations, control component 108 may be configured to control one or more components of system 100. The control component 108 may be configured to control individual light sources of one or more light sources 122, and/or other components. In some implementations, control of individual light sources of one or more light sources 122 may include control of light emission in accordance with instances of virtual content to be presented in an interactive space.

By way of non-limiting illustration, control component 108 may be configured to control one or more light sources 122 to emit light rays to form images of a set of virtual objects. The set of virtual objects may be perceived to be present in the real world within the user's field of view of the real world beyond one or more optical elements 124. Individual virtual objects in the set of virtual object may have individual perceived locations in the real world.

The hand component 110 may be configured to identify presence of objects in the real world. Presence of objects may be identified based on output signals from one or more hand tracking devices 120 and/or other information. By way of non-limiting illustration, hand component 110 may be configured to identify presence of a hand of a user of client device 102.

The hand component 110 may be configured to determine location of objects in the real world. The determination may be based on output signals from one or more hand tracking devices 120 and/or other information. By way of non-limiting illustration, hand component 110 may be configured to determine location of the hand over time. This may facilitate tracking of the location of the hand over time.

The hand component 110 may be configured to determine pose of objects in the real world. The determination of pose may be based on output signals from one or more hand tracking devices 12 and/or other information. By way of non-limiting illustration, hand component 110 may be configured to determine pose of the hand over time. The pose may refer to one or more of heading or orientation (e.g., which way the palm is facing), whether the hand is closed (e.g., in a gripped position) or open (e.g., one or more digits extended), and/or other information.

The interaction component 112 may be configured to correlate the location of a user's hand with one or more virtual objects. In some implementations, correlation may be determined based on distance between the user's hand and individual virtual objects within a set of virtual objects. In some implementations, correlation may be determined based on distance from an individual virtual object within the set of virtual objects to a closest point on the hand. In some implementations, a virtual object being closest to the hand may be correlated with the location of the hand. In some implementations, the correlation may be indicative of an interaction, a likelihood of interaction, and/or an indented interaction, of the hand with the virtual object.

In some implementations, correlation may be determined based on a threshold distance of one or more virtual objects to a hand (e.g., closest point on the hand). The one or more virtual object being within the threshold distance to the hand may be correlated with the location of the hand. In some implementations, one virtual object may be correlated with the hand. In some implementations, multiple virtual objects may be correlated with the hand. In some implementations, the threshold distance may be a perceived distance between the hand and the one or more virtual objects. The threshold distance may be in the range of zero to thirty centimeters and/or other ranges. The threshold distance may be in the range of five to twenty centimeters and/or other ranges. The threshold distance may be in the range of zero to five centimeters and/or other ranges. The threshold distance may be other values.

In some implementations, a user (or multiple users) may utilize multiple hands in the interactive space. In some implementations, individual hands may be associated with individual threshold distances. Accordingly, in some implementations, one or more virtual objects may be correlated with the location of one or more hands.

In some implementations, interaction component 112 may be configured to determine, based on a correlation of a location of the user's hand with a virtual object, and the pose of the user's hand, the user's intent to perform an interaction of the with the virtual object. In some implementations, the pose of the user's hand may be indicative of gesture-based interactions being performed by the user. A gesture may include one or more of clicking, reaching, grabbing, releasing, swiping, pinching, pulling, throwing, pointing, and/or other gestures and/or actions. By way of non-limiting illustration, interaction component 112 may utilize one or more gesture recognition techniques to identify one or more gestures and/or actions being performed by a human hand based on the pose of the hand, the correlation of a virtual object with a location of the user's hand, and/or other information.

In some implementations, interaction component 112 may be configured to determine the amount of simulated "force" a user may desire to apply to a virtual object. In some implementations, force may be determined based on one or more of a speed at which a gesture may be performed, a velocity at which a gesture may be performed, an acceleration at which a gesture may be performed, and/or other information.

In some implementations, control component 108 may be configured to control one or more light sources 122 to emit light forming images of a visual cursor. The images of the visual cursor may be formed so that the virtual cursor may be positionally linked with the hand. For example, the images of the virtual cursor may be superimposed over the views of the hand through one or more optical elements 124 and maintained so that the hand may be tracked, via the virtual cursor, through three-dimensional space.

The virtual cursor may be configured to visually indicate location of the hand as it moves through three-dimensional space. In some implementations, the virtual cursor may include a circle and/or other shapes. In some implementations, the virtual cursor may visually indicate the pose of the hand. For example, the virtual cursor may be visually modified (via modification component 114) in response to a determination of the pose of the user's hand and/or a change in pose of the user's hand.

The modification component 114 may be configured to effectuate modifications to virtual objects. The modifications may be responsive to one or more the pose of the user's hand, the correlation of one or more virtual objects with the location of the user's hand, and/or other information. The modifications may be effectuated by sending instructions or commands control component 108.

The modification component 114 may be configured to, based on determining a location of a user's hand is correlated with one or more virtual objects, instruct control component 108 to control one or more light sources 122 to modify images of the one or more virtual objects. The modification may indicate to the user that the correlation with the one or more virtual objects have been made. This may notify to the user which virtual object (or virtual objects) may respond to user inputs and/or otherwise available to receive user inputs. The user may then proceed to interact with a virtual object, or move their hand until a correlation with one or more other virtual objects is made. The modification may include one or more of highlighting an edge of the virtual object (e.g., increase a brightness of the edge, change a color of the edge, a combination thereof, and/or other highlights), changing a color of the virtual object, an intermittent volume or area change of the virtual object (e.g, a pulsation effect), and/or other modifications.

In some implementations, when multiple virtual objects are correlated with the location for a user hand, different highlights may be applied to different virtual objects. In some implementations, the different highlights may be based on distance of the individual virtual objects to the hand. The different highlights may include different colors of an edge of the virtual objects, and/or other highlights that provide a visual distinction between virtual objects. The particular distinctive highlight on an object may change with the distance between the hand and the object. This may allow a user to use different distinctive highlight as a depth signal. As soon as a location of a virtual object falls outside of a threshold distance from the hand, the virtual object may no longer be correlated with the location of the hand and that object's distinctive highlight may be removed. In some implementations, a distinctive highlight may including one or more of a color, shading change, glow, sound, a variation in intensity of a given highlight, and/or other highlights.

In some implementations, one or more virtual objects may be correlated with multiple locations for multiple hands. The highlight applied to a given virtual object may be based on the closest hand. By way of non-limiting illustration, if an object is within the correlation threshold of multiple hands, a distinctive highlight applied the object may depend on the closest hand. Accordingly, specific distinctive highlights may be assigned to individual hands. The distinctive highlights may be predetermined per hand (e.g., a red highlight for right hand and blue highlight for left hand). In some implementations, a user may be able to specify which distinctive highlight corresponds with which hand. In some implementations, responsive to an interaction being determined between one of multiple hands and one of multiple virtual objects, the remaining virtual object(s) of the multiple virtual objects may be highlighted with a distinctive highlight specific to the remaining hand(s). This may provide an indication that the hand performing an interaction with a given virtual object may be occupied.

The modification component 114 may be configured to, based on the determining the hand is in a given pose or has changed from one pose to another, instruct control component 108 to control one or more light sources 122 to modify an image of a virtual cursor. The modification of the image of the virtual cursor may provide a notification to the user that a change in hand pose has been determined. The modifications of the image of the virtual cursor may include one or more of visually highlighting an edge of the virtual cursor, changing a color of the cursor, and/or other modifications.

In some implementations, the modifications may be specific to hand poses. For example, a first modification may be specific to a first hand pose, a second modification may be specific to a second hand pose, and/or other modifications may be specific to other hand poses. The first modification may include changing the virtual cursor to a first color (or some other distinctive highlight) while the second modification may include changing the virtual cursor to a second color (or some other distinctive highlight). In this manner, the modifications may provide the users with a visual cue as to the hand pose currently being identified by interaction component 112.

In some implementations, in response to determining the hand is in a given pose or has changed from one pose to another, and determining an interaction with a virtual object, modification component 114 may be configured to instruct control component 108 to control one or more light sources 122 to remove highlights from one or more other virtual objects that may have been highlighted due to a prior correlation with the location of hand. In some implementations, in response to determining the hand is in a given pose or has changed from one pose to another, and determining there is no longer an interaction with a given virtual object, modification component 114 may be configured to instruct control component 108 to control one or more light sources 122 to add highlight to one or more virtual objects that may be correlated with location of the hand.

Figure 5:
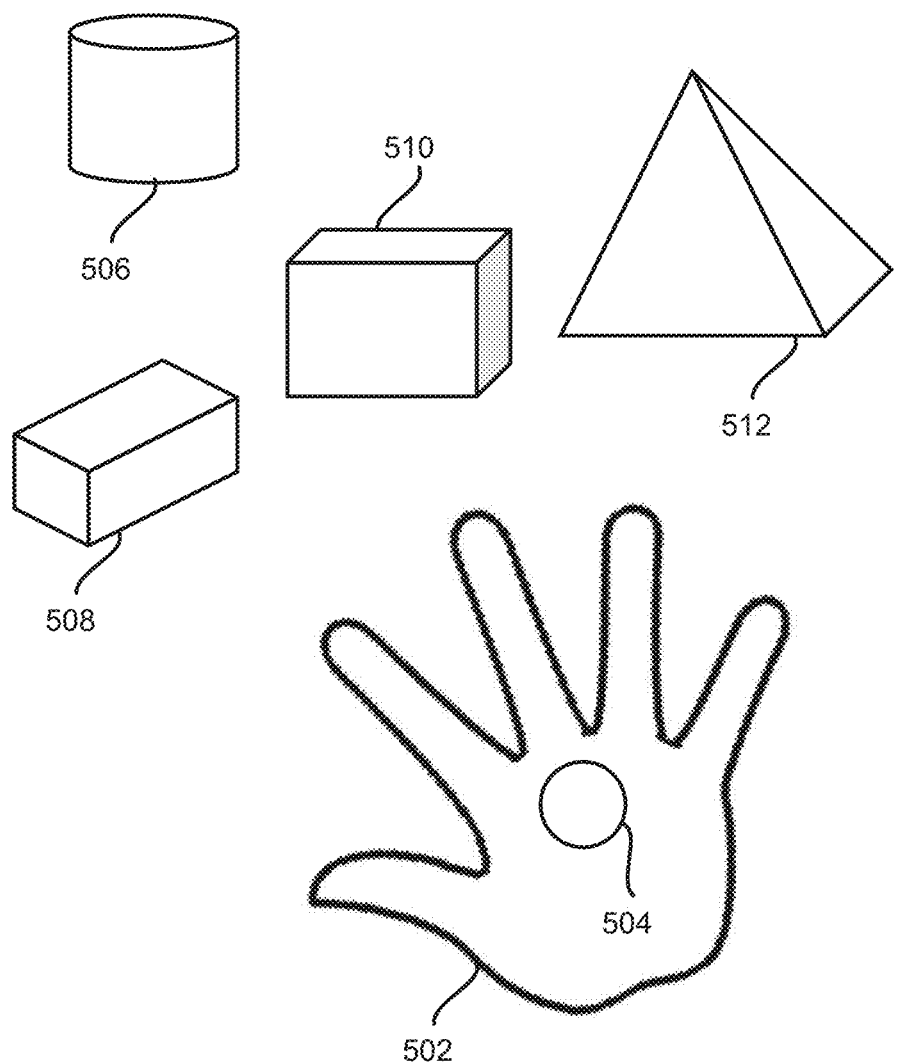
FIG. 5 illustrates a view of an interactive space showing a set of virtual objects, a user object (e.g., hand), and a virtual cursor that is positionally linked with the hand.

FIG. 5 illustrates a view of an interactive space showing a set of virtual objects, a user object 502, and a virtual cursor 504 positionally linked with user object 502. The set of virtual objects may include one or more of a first virtual object 506, a second virtual object 508, a third virtual object 510, a fourth virtual object 512 and/or other virtual objects. The view in FIG. 5 generally shows user object 502 prior to, or approaching, an interaction with one or more objects in the set of virtual objects.

Figure 6:
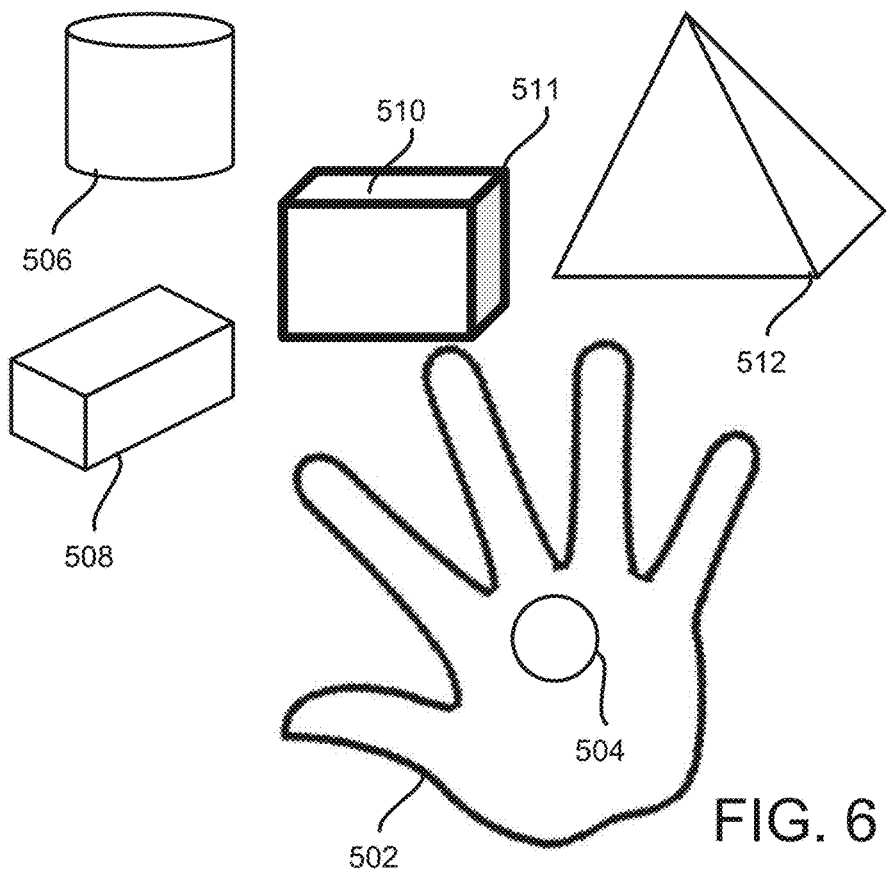
FIG. 6 illustrates the view of the interactive space of FIG. 5, further illustrating a highlight of a virtual object based on location of the user object.

FIG. 6 illustrates the view of the interactive space of FIG. 5, further illustrating a highlight 511 of third virtual object 510 based on user object 502 having a location that is correlated with third virtual object 510. The correlation may be indicative of an interaction and/or attempted interaction being performed by the user object 502. The correlation may be determined based on the dynamic change in the distance of user object 502 to individual objects in the set of virtual objects. By way of non-limiting illustration, third virtual object 510 may be the closest virtual object to user object 502. The highlight 511 may be in the form of visual highlight on the edge (or edges) of third virtual object 510. The visual highlight may include one or more of an increase in brightness, a color change, a volume or area change, and/or other visual highlights.

Figure 7:
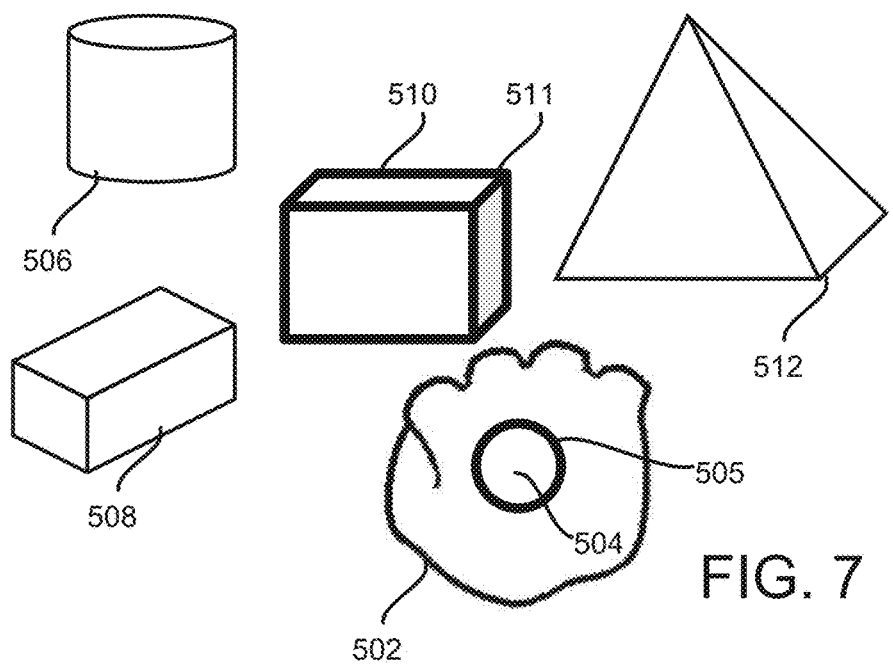
FIG. 7 illustrates the view of the interactive space of FIGS. 5 and 6, further illustrating a highlight of the virtual cursor in response to change in user object pose.

FIG. 7 illustrates the view of the interactive space of FIGS. 5 and 6, further illustrating a highlight 505 of virtual cursor 504 reflecting a determined pose, or a change in pose, of user object 502. By way of non-limiting illustration, user object 502 may have changed from an open hand pose (e.g., the pose shown in FIGS. 5 and 6) to a gripped hand pose. The highlight 505 may provide a visual indication to the user that the system recognizes the change in pose. For example, the user may be attempting a grab interaction with third virtual object 510. The highlight 511 of third virtual object 510 may indicate that third virtual object 510 is currently being interacted with. The highlight 505 of virtual cursor 504 may indicate that the grab interaction has been achieved. The highlight 505 may be in the form of visual highlight on the edge (or edges) of virtual cursor 504. The visual highlight may include one or more of an increase in brightness, a color change, a volume or area change, display of additional virtual content in close proximity to virtual object 510, and/or other visual highlights.

Returning to FIG. 1, one or more physical processors 104, one or more hand tracking devices 120, one or more light sources 122, one or more optical elements 124, external resource(s) 126, and/or other components of system 100 may be operatively linked via one or more electronic communication links. For example, such electronic communication links may be established, at least in part, via network(s) 116. Network(s) 116 may comprise one or both of wired and/or wireless communications. It will be appreciated that this is not intended to be limiting and that the scope of this disclosure includes implementations in which one or more physical processors 104, one or more hand tracking devices 120, one or more light sources 122, one or more optical elements 124, external resource(s) 126, and/or other components of system 100 may be operatively linked via some other communication media.

The external resource(s) 126 may include sources of information, hosts, external entities participating with system 100, providers of virtual content, and/or other resources. In some implementations, some or all of the functionality attributed herein to external resource(s) 126 may be provided by resources included in system 100.

The one or more physical processors 104 may include and/or have access to electronic storage 115, and/or other components. The one or more physical processors 104 may include communication lines or ports to enable the exchange of information with a network, electronic storage 115, and/or other components of system 100. Illustration of one or more physical processors 104 in FIG. 1 is not intended to be limiting. The one or more physical processors 104 may include a plurality of hardware, software, and/or firmware components operating together to provide the functionality attributed herein to one or more physical processors 104. For example, one or more physical processors 104 may be implemented by a cloud of computing platforms operating together as one or more physical processors 104.

The electronic storage 115 may comprise electronic storage media that electronically stores information. The electronic storage media of electronic storage 115 may include one or both of system storage that is provided integrally (i.e., substantially non-removable) with one or more physical processors 104 and/or removable storage that is removably connectable to one or more physical processors 104 via, for example, a port or a drive. A port may include a USB port, a firewire port, and/or other port. A drive may include a disk drive and/or other drive. The electronic storage 115 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 115 may include one or more virtual storage resources (e.g., cloud storage, a virtual private network, and/or other virtual storage resources). The electronic storage 115 may store software algorithms, information determined by one or more physical processors 104, information received from other components of system 100, and/or other information that enables one or more physical processors 104 to function as described herein.

One or more physical processors 104 is configured to provide information-processing capabilities. As such, one or more physical processors 104 may include one or more of a digital processor, an analog processor, a digital circuit designed to process information, an analog circuit designed to process information, a state machine, and/or other mechanisms for electronically processing information. Although one or more physical processors 104 is shown in FIG. 1 as a single entity, this is for illustrative purposes only. In some implementations, one or more physical processors 104 may include one or more processing units. These processing units may be physically located within the same device, or one or more physical processors 104 may represent processing functionality of a plurality of devices operating in coordination. The one or more physical processors 104 may be configured to execute components 108, 110, 112, and/or 114. One or more physical processors 104 may be configured to execute components 108, 110, 112, and/or 114 by software; hardware; firmware; some combination of software, hardware, and/or firmware; and/or other mechanisms for configuring processing capabilities on one or more physical processors 104.

It should be appreciated that although components 108, 110, 112, and/or 114 are illustrated in FIG. 1 as being co-located within a single processing unit, in implementations in which one or more physical processors 104 includes multiple processing units, one or more of components 108, 110, 112, and/or 114 may be located remotely from the other components. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, 114, and/or other components. As another example, one or more physical processors 104 may be configured to execute one or more additional components that may perform some or all of the functionality attributed to one of components 108, 110, 112, and/or 114.

Figure 2:
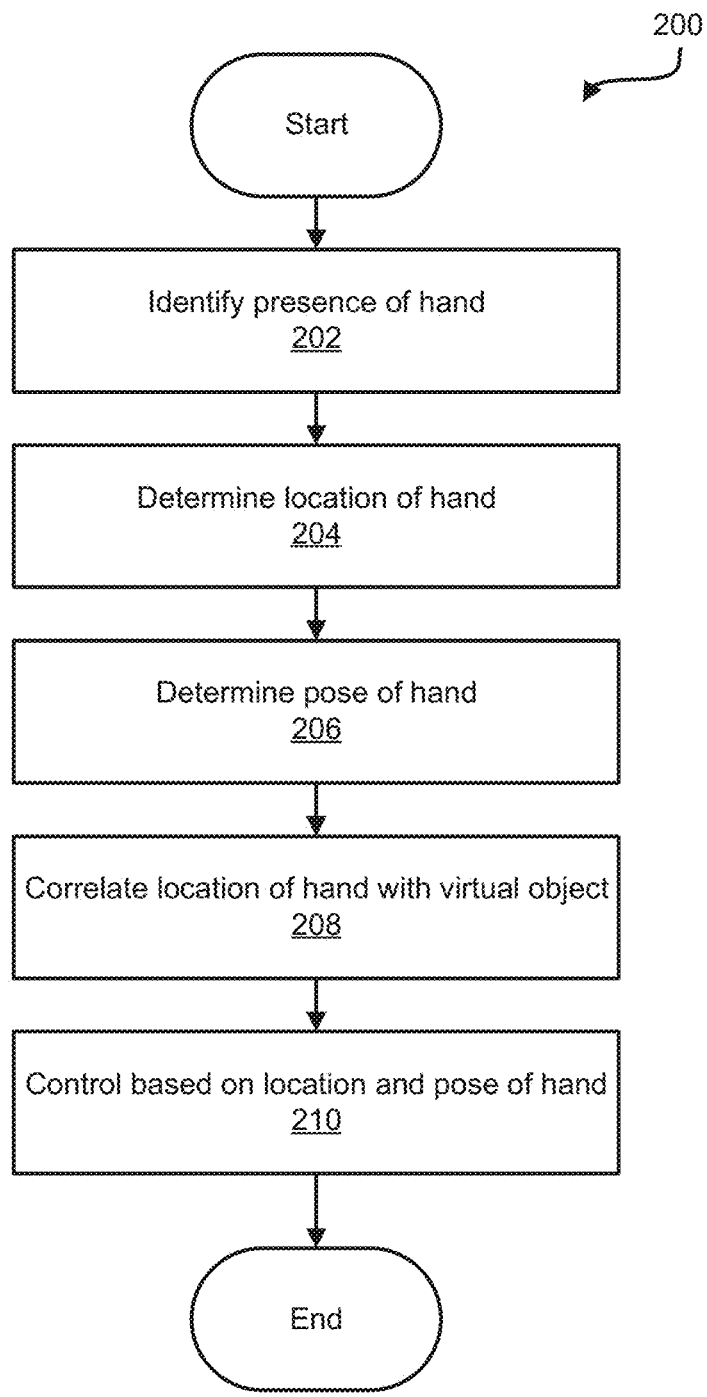
FIG. 2 illustrates a method to facilitate interactions with virtual content in an interactive space, in accordance with one or more implementations.

FIG. 2 illustrates a method 200 to facilitate interactions with virtual content in an interactive space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more hand tracking devices, one or more optical elements, and/or other components. The one or more processing devices may include one or more devices executing some or all of the operations of method 200 in response to instructions stored electronically on electronic storage. The one or more processing devices may include one or more devices configured through hardware, firmware, and/or software to be specifically designed for execution of one or more of the operations of method 200.

At an operation 202, presence of a user's hand may be identified. The presence may be identified based on output signals generated by one or more hand tracking devices. The output signals may convey depth information. The depth information may include ranges of surfaces and/or object present in the real world. In some implementations, operation 202 may be performed by one or more physical processors executing a hand component the same as or similar to hand component 110 (shown in FIG. 1 and described herein).

At an operation 204, location of the user's hand may be determined. In some implementations, operation 204 may be performed by one or more physical processors executing a hand component the same as or similar to hand component 110 (shown in FIG. 1 and described herein).

At an operation 206, pose of the user's hand may be determined. In some implementations, operation 206 may be performed by one or more physical processors executing a hand component the same as or similar to hand component 110 (shown in FIG. 1 and described herein).

At an operation 208, the location of the hand user's may be correlated with one or more virtual objects. In some implementations, operation 208 may be performed by one or more physical processors executing an interaction component the same as or similar to interaction component 112 (shown in FIG. 1 and described herein).

At an operation 210, control of one or more image-forming components may be effectuated based on the location and/or the pose of the hand. For example, based on the location of the hand, the one or more image-forming components may be configured to emit light rays forming an image of a virtual cursor such that the virtual cursor is positionally linked with the hand. Based on determining the location of the hand is correlated with a first virtual object, an image of the first virtual object may be modified. Based on the determining the hand is in a first pose, the image of the virtual cursor may be modified. In some implementations, operation 210 may be performed by one or more physical processors executing a modification component the same as or similar to modification component 114 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide an interface with three-dimensional virtual content, the system comprising:
a client device configured to be worn on a head of a user;
one or more image-forming components held by the client device, the one or more image-forming components being configured to emit light rays forming images of virtual content, the images being presented to the user;
one or more hand tracking devices configured to generate output signals conveying ranges of surfaces and/or objects present in the real world; and
one or more physical processors configured by machine-readable instructions to:
identify, based on the output signals, presence of one or more hands of the user;
determine, based on the output signals, location of the one or more hands;
determine, based on the output signals, pose of the one or more hands;
correlate the location of the one or more hands with individual locations of two or more virtual objects;
control the one or more image-forming components based on the location of the one or more user's hands, including controlling the one or more image-forming components to:
based on determining the locations of the one or more user's hands are correlated with locations of first and second virtual objects, modify images of the first and second virtual objects,
wherein the modification to the image of the second virtual object is visually distinct from the modification to the image of the first virtual object.

2. The system of claim 1, wherein the modification of the image of the first virtual object includes highlighting an edge of the first virtual object.

3. The system of claim 1, further controlling the one or more image-forming components to:
based on the location of a first one of the user's hands, emit light rays forming an image of a virtual cursor such that the virtual cursor is positionally linked with the location of the user's first hand as determined by the output signals of the one or more hand tracking devices
based on the determining the user's first hand is in a first pose, determine an interaction with the first virtual object and modify the image of the virtual cursor in response to the interaction, wherein the modification of the image of the virtual cursor includes highlighting an edge of the virtual cursor.

4. The system of claim 3, wherein the interaction is a grab.

5. The system of claim 4, wherein the first pose is a closed hand, indicating the user's intention to perceive that the virtual content as being grabbed by the user's first hand.

6. The system of claim 1, wherein the one or more image-forming components are configured such that when the client device is worn on the user's head, the light rays are provided to one or both eyes of the user and superimposed over views of the real world to create an augmented reality environment.

7. The system of claim 1, wherein the correlation of the location of one of the user's hand with the location of a first one of the virtual objects is based on determining individual distances of individual virtual objects from the user's hand, and wherein the location of the user's hand is correlated with the location of the first virtual object based on the first virtual object being closer to the location of the user's hand than other virtual objects.

8. The system of claim 1, wherein the client device is a headset.

9. The system of claim 1, wherein the one or more hand tracking devices comprise one or more of a camera, a three-dimensional scanner, a depth sensor, a rangefinder, a laser gauge, a time-of-flight sensor, an IR camera/emitter pair, a passive structured light stereo pair, or a passive unstructured light stereo pair.

10. The system of claim 1, wherein the one or more hand tracking devices are incorporated into the client device.

11. The system of claim 1, wherein the modification to the image of one of the virtual objects varies as a distance between the location of one of the user's hands and the location of the virtual object changes.

12. The system of claim 1, wherein:
a location of first one of the user's hands is correlated with the locations of the first virtual object and the second virtual object; and
the modification to the second image is visually distinct from the modification to the first image of the first virtual object based on the locations of first virtual object and the second virtual object being at different distances from the location of the user's hand.

13. The system of claim 1, wherein:
a first location of a first one of the user's hands is correlated with a first location of a first one of the two or more virtual objects and a second location of a second one of the user's hands is correlated with a second location of a second virtual object; and
the modification to the second image is visually distinct from the modification to the first image of the first virtual object based on the location of the first virtual object being correlated with the location of the user's hand and the second location of the second virtual object being correlated with the second location of the second hand.

14. The system of claim 13, wherein distinctive modifications are exclusively assigned to each of the first and second hands.

15. The system of claim 1, wherein the correlation of the location of one of the user's one or more hands with the location of one of the two or more virtual objects is based on the location of the virtual object being within a threshold distance from the location of the user's hand.

16. A method to provide an interface with three-dimensional virtual content, the method comprising:

emitting light rays forming images of virtual content, the images being presented to a user;
identifying, based on output signals conveying ranges of surfaces and/or objects present in the real world, presence of one or more hands of the user;
determining, based on the output signals, location of the one or more hands;
determining, based on the output signals, pose of the one or more hands;
correlating the locations of the one or more hands with a locations of two or more virtual objects; and
controlling the emission of the light rays based on the location of the one or more hands, including:
based on determining the locations of the one or more hands are correlated with a locations of first and second virtual objects, modifying images of the first and second virtual objects;
wherein the modification to the image of the second virtual object is visually distinct from the modification to the image of the first virtual object.

17. The method of claim 16, wherein the modification of the image of the first virtual object includes highlighting an edge of the first virtual object.

18. The method of claim 16, further controlling the emission of the light rays to:
based on the location of a first one of the user's hands emitting light rays forming an image of a virtual cursor such that the virtual cursor is positionally linked with the location of the user's first hand, as determined from the output signals;
based on determining the location of the user's first hand is correlated with a location of a first virtual object, modifying an image of the first virtual object; and
based on the determining the user's first hand is in a first pose, determining an interaction with the first virtual object and modifying the image of the virtual cursor in response to the interaction,
wherein the modification of the image of the virtual cursor includes highlighting an edge of the virtual cursor.

19. The method of claim 18, wherein the interaction is a grab.

20. The method of claim 19, wherein the first pose is a closed hand, indicating the user's intention to perceive that the virtual content as being grabbed by the user's first hand.

21. The method of claim 16, further comprising:
providing the light rays to one or both eyes of the user to superimpose the light rays over views of the real world to create an augmented reality environment.

22. The method of claim 16, wherein the correlation of the location of one of the user's hands with the location of a first one of the virtual objects is based on determining individual distances of individual virtual objects from the user's hand, and wherein the location of the user's hand is correlated with the location of the first virtual object based on the first virtual object being closer to the location of the user's hand than other virtual objects.

23. The method of claim 16, wherein the output signals are generated by one or more hand tracking devices.

24. The method of claim 23, wherein the one or more hand tracking devices are incorporated into a client device.

25. The method of claim 24, wherein the method is implemented in a system including one or more physical processors coupled to the client device, the client device being configured to be installed on a head of the user.

26. The method of claim 16, wherein the modification to the image of one of the virtual objects varies as a distance between the location of one of the user's hands and the location of the virtual object changes.

27. The method of claim 16, wherein:
a location of first one of the user's hands is correlated with the locations of the first virtual object and the second virtual object; and
the modification to the second image is visually distinct from the modification to the first image of the first virtual object based on the locations of first virtual object and the second virtual object being at different distances from the location of the user's hand.

28. The method of claim 16, wherein:
a first location of a first one of the user's hands is correlated with a first location of a first one of the two or more virtual objects and a second location of a second one of the user's hands is correlated with a second location of a second virtual object; and
the modification to the second image is visually distinct from the modification to the first image of the first virtual object based on the location of the first virtual object being correlated with the location of the user's hand and the second location of the second virtual object being correlated with the second location of the second hand.

29. The method of claim 28, wherein distinctive modifications are exclusively assigned to each of the first and second hands.

30. The method of claim 16, wherein the correlation of the location of one of the user's one or more hands with the location of one of the two or more virtual objects is based on the location of the virtual object being within a threshold distance from the location of the user's hand.

* * * * *